(12) United States Patent
Santoso

(10) Patent No.: US 8,428,848 B2
(45) Date of Patent: Apr. 23, 2013

(54) COMBUSTION CONTROL SYSTEMS AND METHODS

(75) Inventor: Halim G. Santoso, Novi, MI (US)

(73) Assignee: GM Global Technology Operations LLC

( * ) Notice: Subject to any disclaimer, the term of this patent is extended or adjusted under 35 U.S.C. 154(b) by 428 days.

(21) Appl. No.: 12/782,194

(22) Filed: May 18, 2010

(65) Prior Publication Data

US 2011/0288749 A1  Nov. 24, 2011

(51) Int. Cl.
*B60T 7/12* (2006.01)

(52) U.S. Cl.
USPC ....... 701/103; 123/434; 123/435; 123/406.47

(58) Field of Classification Search .......... 701/103–105, 701/114, 115; 123/434, 435, 406.11, 406.47
See application file for complete search history.

(56) References Cited

U.S. PATENT DOCUMENTS

| | | | | |
|---|---|---|---|---|
| 5,038,744 A | * | 8/1991 | Martin et al. | 123/625 |
| 5,323,748 A | * | 6/1994 | Foster et al. | 123/435 |
| 5,816,218 A | * | 10/1998 | Motose | 123/406.18 |
| 2001/0017127 A1 | * | 8/2001 | Flynn et al. | 123/435 |
| 2002/0026926 A1 | * | 3/2002 | Loye et al. | 123/435 |
| 2008/0294323 A1 | * | 11/2008 | Shinozaki et al. | 701/102 |
| 2009/0118973 A1 | * | 5/2009 | Gillespie et al. | 701/103 |
| 2009/0164100 A1 | * | 6/2009 | Ostberg et al. | 701/103 |
| 2010/0037858 A1 | * | 2/2010 | Kang et al. | 123/406.23 |

* cited by examiner

*Primary Examiner* — John Kwon

(57) ABSTRACT

A combustion control system for a direct injection engine includes a mean effective pressure (MEP) determination module, a coefficient of variation (COV) determination module, a spark timing module, and a fuel control module. The MEP determination module determines a MEP for a first combustion event of a cylinder based on cylinder pressure measured by a cylinder pressure sensor during the first combustion event. The COV determination module determines a COV for the cylinder based on the MEP. The spark timing module selectively sets a spark timing for a second combustion event of the cylinder based on the COV. The second combustion event is after the first combustion event. The fuel control module that selectively provides fuel for the second combustion event based on the COV.

18 Claims, 3 Drawing Sheets

COMBUSTION CONTROL SYSTEMS AND METHODS

FIELD

The present disclosure relates to engine control systems and methods and more particularly to cylinder pressure.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve controls airflow into the engine. The air mixes with fuel from one or more fuel injectors to form an air/fuel mixture. The air/fuel mixture is combusted within one or more cylinders of the engine. Combustion of the air/fuel mixture may be initiated by, for example, injection of the fuel or spark provided by a spark plug.

Combustion of the air/fuel mixture produces torque and exhaust gas. Torque is generated via heat release and expansion during combustion of the air/fuel mixture. The engine transfers torque to a transmission via a crankshaft, and the transmission transfers torque to one or more wheels via a driveline. The exhaust gas is expelled from the cylinders to an exhaust system.

An engine control module (ECM) controls the torque output of the engine. The ECM may control the torque output of the engine based on driver inputs and/or other inputs. The ECM may modify how and when fuel and/or spark is provided to the cylinders for one or more events. The ECM retards the spark timings and provides fuel to the cylinders in two separate injections to during a catalyst lightoff event.

SUMMARY

A combustion control system for a direct injection engine includes a mean effective pressure (MEP) determination module, a coefficient of variation (COV) determination module, a spark timing module, and a fuel control module. The MEP determination module determines a MEP for a first combustion event of a cylinder based on cylinder pressure measured by a cylinder pressure sensor during the first combustion event. The COV determination module determines a COV for the cylinder based on the MEP. The spark timing module selectively sets a spark timing for a second combustion event of the cylinder based on the COV. The second combustion event is after the first combustion event. The fuel control module that selectively provides fuel for the second combustion event based on the COV.

A combustion control method for a direct injection engine includes: determining a mean effective pressure (MEP) for a first combustion event of a cylinder based on cylinder pressure measured by a cylinder pressure sensor during the first combustion event; determining a coefficient of variation (COV) for the cylinder based on the MEP; selectively setting a spark timing for a second combustion event of the cylinder based on the COV, wherein the second combustion event is after the first combustion event; and selectively providing fuel for the second combustion event based on the COV.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
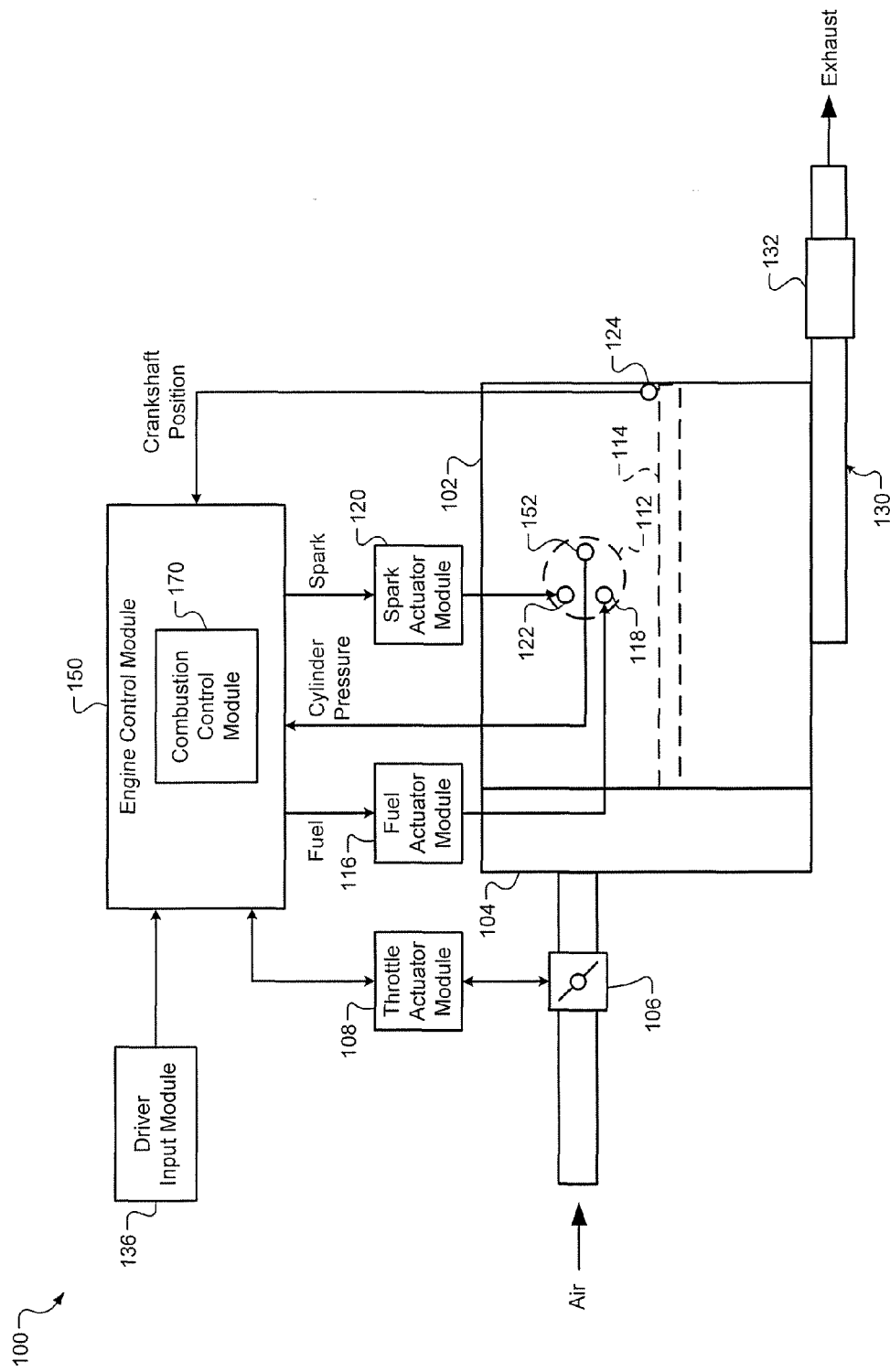
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A control module controls provision of fuel and spark to cylinders of an engine. More specifically, the control module controls how much fuel is supplied to a given cylinder, when the fuel is supplied to the cylinder, and spark timing used to initiate combustion within the cylinder. In contrast with times when a catalyst lightoff (CLO) event is inactive, the control module may selectively retard the spark timing and may provide fuel to the cylinder in two separate injections when the CLO event is active. The combination of the retarded spark timing and the provision of fuel in two separate injections produces hotter exhaust gas that includes a lower concentration of hydrocarbons. The hotter exhaust gas may help warm a catalyst (e.g., a three-way catalyst) to greater than a predetermined lightoff temperature at an earliest possible time. However, too much spark retard may cause a misfire.

The control module of the present disclosure determines a mean effective pressure (MEP) for a combustion event of a cylinder based on a cylinder pressure measured by a cylinder pressure sensor during the combustion event. The control module determines a coefficient of variation (COV) for the cylinder based on a predetermined number of MEPs determined for the cylinder. The COV may correspond to how stable combustion within the cylinder is or how close the cylinder is to sustaining a misfire. For example only, as the COV increases, the combustion may be more unstable and a possibility of misfire may increase.

The control module selectively controls the spark timing and an end of fuel injection (EOI) timing based on the COV. Controlling the spark timing and the EOI timing based on the COV may allow the control module to prevent misfire while warming the catalyst as fast as possible.

Referring now to FIG. 1, a functional block diagram of an exemplary engine system 100 is presented. The engine system 100 includes a direct-injection engine 102 that combusts an air/fuel mixture to produce drive torque. Air is drawn into an intake manifold 104 through a throttle valve 106. A throttle actuator module 108 controls opening of the throttle valve 106. Air from the intake manifold 104 is drawn into cylinders of the engine 102. While the engine 102 may include more than one cylinder, for illustration purposes only, only cylinder 112 is shown.

The engine 102 may operate using a four-stroke cylinder cycle. The four strokes, described below, may be referred to as the intake stroke, the compression stroke, the combustion stroke, and the exhaust stroke. During each revolution of a crankshaft 114, two of the four strokes occur within the cylinder 112. Therefore, two crankshaft revolutions are necessary for the cylinder 112 to experience all four of the strokes of one engine cycle.

During the intake stroke of the cylinder 112, air from the intake manifold 104 is drawn into the cylinder 112. A fuel actuator module 116 controls opening of a fuel injector 118 associated with the cylinder 112. The injected fuel mixes with air and creates an air/fuel mixture in the cylinder 112. During the compression stroke of the cylinder 112, a piston (not shown) compresses the air/fuel mixture within the cylinder 112.

A spark actuator module 120 energizes a spark plug 122 associated with the cylinder 112, and spark generated by the spark plug 122 ignites the air/fuel mixture. The timing of the spark may be specified relative to the time when the piston is at its topmost position, referred to as top dead center (TDC). Because piston position is directly related to crankshaft rotation, the spark timing may be synchronized with crankshaft position.

A crankshaft position sensor 124 monitors rotation of the crankshaft 114 and generates a crankshaft position signal based on the position of the crankshaft 114. The crankshaft position sensor 124 may include a variable reluctance (VR) sensor or another suitable type of crankshaft position sensor. The crankshaft position signal may include a pulse train. Each pulse of the pulse train may be generated as a tooth of an N-toothed wheel (not shown) that rotates with the crankshaft 114, passes the crankshaft position sensor 124. Accordingly, each pulse corresponds to an angular rotation of the crankshaft 114 by an amount equal to 360° divided by N teeth. The N-toothed wheel may also include a gap of one or more missing teeth. Engine speed in revolutions per minute (RPM) may be determined based on the crankshaft position.

During the combustion stroke, which may also be referred to as the expansion stroke, the combustion of the air/fuel mixture drives the piston down, thereby driving rotation of the crankshaft 114. The combustion stroke may be defined as the time between the piston reaching TDC and the time at which the piston returns to bottom dead center (BDC). A combustion event of a given cylinder may refer to when fuel is combusted within the cylinder or the combustion stroke of the cylinder.

During the exhaust stroke, the piston begins moving up from a bottom dead center (BDC) position and expels exhaust gas resulting from combustion from the cylinder 112. The exhaust gas is expelled from the cylinder 112 to an exhaust system 130. A catalyst 132 receives the exhaust gas output by the engine 102 and reacts with various components of the exhaust gas. For example only, the catalyst 132 may include a three-way catalyst (TWC), a catalytic converter, or another suitable exhaust catalyst.

An engine control module (ECM) 150 controls the fuel injector 118 via the fuel actuator module 116. More specifically, the ECM 150 controls the amount of fuel injected into the cylinder 112 and when the fuel is injected. The ECM 150 controls the spark plug 122 via the spark actuator module 120. More specifically, the ECM 150 may control spark timing via the spark actuator module 120.

The ECM 150 may control the fuel injection and the spark timing to control torque output by the engine 102 (e.g., torque about the crankshaft 114). The ECM 150 may regulate the torque output of the engine 102 based on driver inputs provided by the driver input module 136 and inputs from one or more torque requestors.

The ECM 150 may selectively adjust one or more engine operating parameters based on parameters measured by one or more sensors. A cylinder pressure sensor 152 measures pressure within the cylinder 112 and generates a cylinder pressure signal based on the measured pressure. For example only, one cylinder pressure sensor may be provided for each cylinder of the engine 102.

The ECM 150 receives the cylinder pressure signal and the crankshaft position signal. The ECM 150 may also receive signals from one or more other sensors, such as an engine coolant temperature sensor, a manifold absolute pressure (MAP) sensor, a mass air flow (MAF) sensor, a throttle position sensor, an intake air temperature (IAT) sensor, and/or other suitable sensors.

The ECM 150 may also control the fuel injection and/or the spark timing for one or more events. For example only, the ECM 150 may adjust the fuel injection and the spark timing for performance of a catalyst lightoff (CLO) event. A CLO event may be initiated after a vehicle startup (e.g., key ON) to increase a temperature of the catalyst 132 above a predetermined lightoff temperature. When the catalyst temperature is less than the predetermined lightoff temperature, the ability of the catalyst 132 to react with various components of the exhaust gas may be limited.

When a CLO event is active, the ECM 150 separates the provision of fuel to the cylinder 112 into two separate injections. The two injections may be referred to as a primary fuel injection and a secondary fuel injection. The ECM 150 also retards the spark timing relative to a predetermined spark timing (e.g., MBT) when the CLO mode is active.

In comparison with combustion at a non-retarded spark timing, the retarded spark timing reduces the amount of hydrocarbons (HC) in the exhaust gas and increases the temperature of the exhaust gas. The increased exhaust gas temperature provides additional heat to the catalyst 132 to warm the catalyst 132 at a faster rate. However, retarding the spark timing may cause what may be generally referred to as combustion instability within the cylinder 112, such as misfire and/or decreased torque production.

The ECM 150 of the present disclosure includes a combustion control module 170 that monitors the cylinder pressure signal. The combustion control module 170 determines a mean effective pressure (MEP) for each combustion event of each of the cylinders of the engine 102 based on the cylinder pressure measured within the cylinders, respectively. For example only, the combustion control module 170 determines MEPs for the cylinder 112 based on the cylinder pressure measured by the cylinder pressure sensor 152 during the combustion events of the cylinder 112, respectively.

The combustion control module 170 also determines a coefficient of variation (COV) for each of the cylinders based on a predetermined number of the MEPs determined for the cylinders, respectively. For example only, the combustion control module 170 determines the COV for the cylinder 112 based on a predetermined number of the MEPs determined for the cylinder 112.

When the CLO event is active, the combustion control module 170 selectively determines a spark timing for the cylinder 112 based on the COV. The combustion control module 170 also selectively determines an end of injection (EOI) timing for the secondary fuel injection of the cylinder 112 based on the COV when the CLO event is active.

The combustion control module 170 sets the spark timing for a next combustion event of the cylinder 112 based on the spark timing. The combustion control module 170 controls the secondary fuel injection for the next combustion event of the cylinder 112 based on the EOI timing. More specifically, the combustion control module 170 ends the secondary fuel injection at the EOI timing.

After the next combustion event, the combustion control module 170 determines a new MEP for the next combustion event and updates the COV of the cylinder 112 based on the new MEP. The combustion control module 170 selectively adjusts the spark timing and/or the EOI for a next combustion event of the cylinder 112 based on the COV. The combustion control module 170 may continue this process of determining a new MEP, updating the COV, and selectively adjusting the spark timing and/or the EOI timing until the CLO event is complete.

While the combustion control module 170 is shown and discussed as being located within the ECM 150, the combustion control module 170 may be located in another suitable location. For example only, the combustion control module 170 may be located external to the ECM 150 or in another suitable module.

Figure 2:
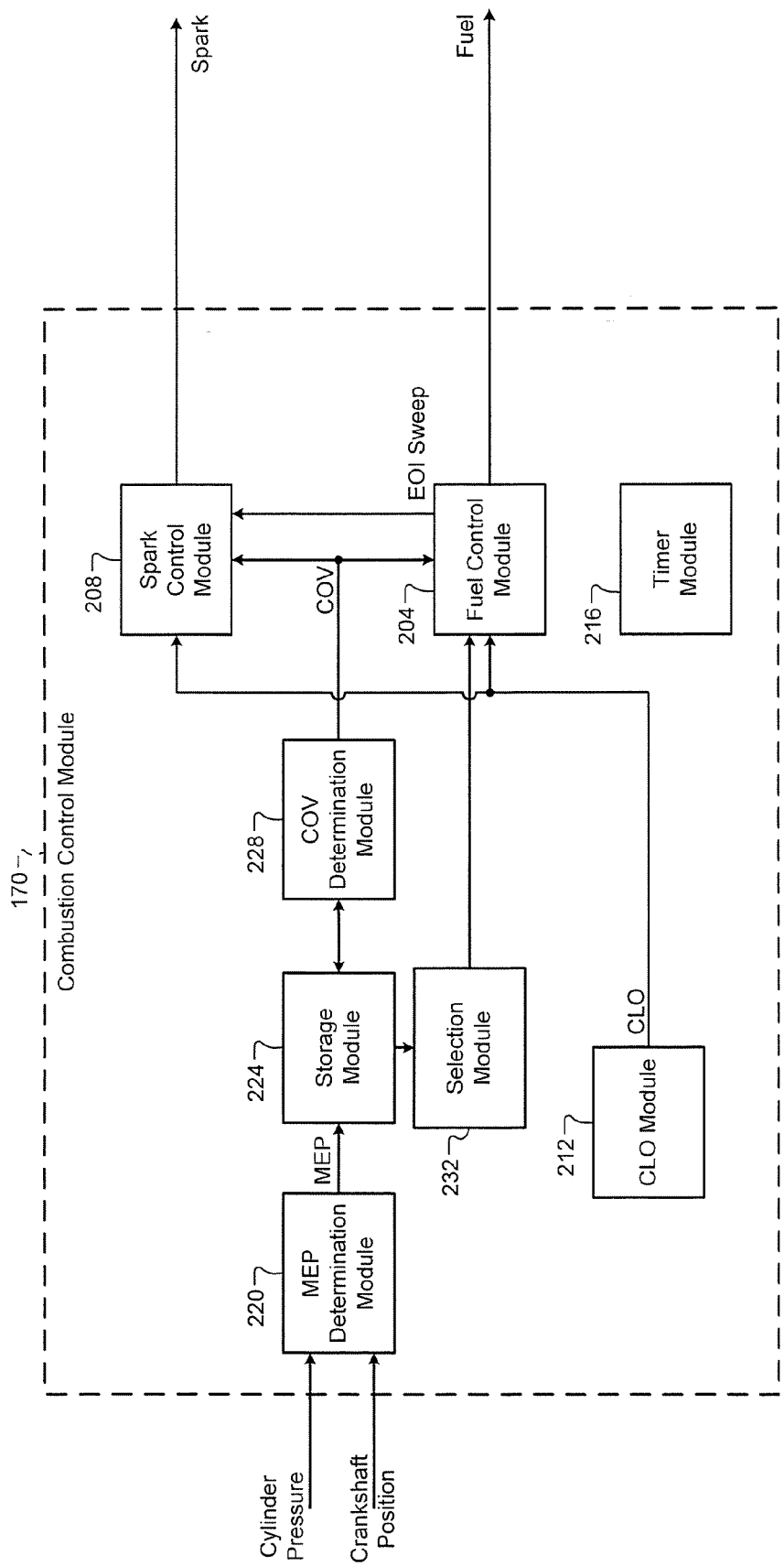
FIG. 2 is a functional block diagram of an exemplary combustion control module according to the principles of the present disclosure.

Referring now to FIG. 2, a functional block diagram of an exemplary implementation of the combustion control module 170 is presented. The combustion control module 170 includes a fuel control module 204, a spark control module 208, a catalyst lightoff (CLO) module 212, and a timer module 216. The combustion control module 170 also includes a mean effective pressure (MEP) determination module 220, a storage module 224, and a coefficient of variation (COV) determination module 228. While the combustion control module 170 will be discussed as it relates to controlling the provision of fuel and spark to the cylinder 112, the combustion control module 170 may perform similarly or identically for the other cylinders of the engine 102.

The fuel control module 204 controls the provision of fuel to the cylinder 112. The spark control module 208 controls the spark timing for the cylinder 112. During normal operation, the fuel control module 204 may provide fuel to the cylinder 112 in one injection. When a CLO event is active, the fuel control module 204 provides the secondary fuel injection to the cylinder 112. The spark control module 208 retards the spark timing (relative to normal operation) when the CLO is active. The combination of the secondary fuel injection and the retarded spark timing may increase the amount of heat provided to the catalyst 132.

The CLO module 212 generates a catalyst lightoff (CLO) signal that indicates whether the CLO event is active. For example only, the CLO module 212 may set the CLO signal to an active state (e.g., 5 V) when the CLO event is active. When the CLO event is inactive, the CLO signal may be in an inactive state (e.g., 0 V).

The CLO module 212 may activate the CLO event, for example, when the temperature of the catalyst 132 is less than a predetermined lightoff temperature upon vehicle startup (e.g., key ON). The CLO module 212 may deactivate the CLO event when the temperature of the catalyst 132 exceeds the predetermined lightoff temperature.

When the CLO is active, the fuel control module 204 may determine the amount of fuel for the secondary fuel injection. The amount may be a predetermined amount (e.g., mass) in various implementations. The fuel control module 204 also determines when the secondary fuel injection should be performed when the CLO event is active. More specifically, the fuel control module 204 determines the end of injection (EOI) timing for the secondary fuel injection when the CLO event is active. The EOI timing refers to the time when the fuel control module 204 ends the secondary fuel injection. The EOI timing may be specified relative to a predetermined piston position, such as the TDC position or the BDC position.

The fuel control module 204 may set the EOI timing to a predetermined EOI timing (e.g., a base EOI timing) for a predetermined period after the CLO event is activated in various implementations. For example only, the predetermined period may be approximately 1.0 second. The spark control module 208 may set the spark timing to a predetermined spark timing (e.g., a base spark timing) for the predetermined period after the CLO event is activated in various implementations.

The timer module 216 may begin incrementing a timer when the CLO event is activated (e.g., when the CLO signal transitions from the inactive state to the active state). The timer module 216 may also reset the timer to a predetermined reset value (e.g., 0.0) when the CLO event is activated. In this manner, the timer tracks the period elapsed since the CLO event was activated.

After the predetermined period has passed (e.g., when the timer is greater than the predetermined period), the fuel control module 204 determines the EOI timing for the cylinder 112 based on the coefficient of variation (COV) determined for the cylinder 112. After the predetermined period has passed, the spark control module 208 determines the spark timing for the cylinder 112 based on the COV. The COV determination module 228 determines the COV as discussed below. The fuel control module 204 and the spark control module 208 may return to normal control of the provision of fuel and spark to the cylinder 112 when the CLO event is deactivated.

The MEP determination module 220 determines a MEP for each combustion event of the cylinder 112. The MEP determination module 220 determines the MEP for a given combustion event based on the cylinder pressure measured by the cylinder pressure sensor 152 during the combustion event. In this manner, the MEP determination module 220 determines one MEP for each combustion event of the cylinder 112. The storage module 224 receives the MEPs from the MEP determination module 220, and the storage module 224 stores the MEPs. The storage module 224 may store the MEPs by the cylinder 112.

The COV determination module 228 determines the COV for the cylinder 112 based on a predetermined number of the MEPs. For example only, the predetermined number of the MEPs may include the last five (5) MEPs (corresponding to the last predetermined number of combustion events) determined for the cylinder 112. The predetermined period during which the spark timing and the EOI timing may be set to predetermined spark and EOI timings, respectively, may correspond to a maximum period for the MEP determination module 220 to determine the predetermined number of MEPs.

The COV determination module 228 may calculate the COV, for example, using the equation:

$$COV = \sqrt{\frac{(MEP_1 - \text{Mean})^2 + (MEP_2 - \text{Mean})^2 + \ldots + (MEP_N - \text{Mean})^2}{N}},$$

where COV is the COV of the MEPs from a mean of the MEPs, Mean is the mean of the MEPs, N is the predetermined number of MEPs determined for the cylinder 112, N is an integer greater than one, $MEP_1$ is a first one of the N MEPs determined for the cylinder 112, $MEP_2$ is a second one of the N MEPs determined for the cylinder 112, and $MEP_N$ is the N-th one of the N MEPs determined for the cylinder 112. The storage module 224 may store the COV by the cylinder 112.

After the predetermined period has passed, the fuel control module 204 and the spark control module 208 determine the spark timing and the EOI timing, respectively, for a next combustion event of the cylinder 112 based on the COV. The spark control module 208 may determine the spark timing for the next combustion event as a function of the COV, from a mapping of COV to retarded spark timing, or in another suitable manner. The fuel control module 204 may determine the EOI timing for the secondary fuel injection of the next combustion event as a function of the COV, from a mapping of COV to EOI timing, or in another suitable manner.

The COV determination module 228 may thereafter determine the COV for the cylinder 112 after each combustion event of the cylinder 112, when the MEP determination module 220 determines a new MEP for a most recently completed combustion event of the cylinder 112. For example only, the COV determination module 228 determines the COV including the new MEP and excluding an oldest one of the predetermined number of MEPs. In this manner, the COV determination module 228 updates the COV after each combustion event based on the new MEP, and the updated COV reflects the predetermined number of the most recently determined MEPs.

The fuel control module 204 and/or the spark control module 208 may make an adjustment based on the updated COV. The spark control module 208 may further retard the spark timing for a next combustion event when the updated COV is less than a first predetermined COV. The first predetermined COV may correspond to a COV above which the combustion of the cylinder 112 may be unstable and may incur a misfire. For example only, the first predetermined COV may be approximately 17 percent or 0.17. The spark control module 208 may further retard the spark timing by a predetermined amount in various implementations. In this manner, when combustion within the cylinder 112 is stable, the spark timing may be further retarded to provide additional heat to the catalyst 132.

When the updated COV is greater than or equal to the first predetermined COV, the fuel control module 204 may initiate a sweep of the EOI timing through a predetermined range around the predetermined (i.e., base) EOI timing. The predetermined range may be established based on one or more conditions that may call for use of a different EOI timing. The conditions may include, for example, aging of the fuel injector 118, the presence of carbon on the piston, engine-to-engine differences, and other suitable conditions.

The fuel control module 204 may generate an EOI sweep signal that indicates whether the fuel control module 204 is performing the sweep. For example only, the fuel control module 204 may set the EOI sweep signal to an active state (e.g., 5 V) when fuel control module is performing the sweep. Otherwise, the EOI sweep signal may be set to in an inactive state (e.g., 0 V). The spark control module 208 maintains the spark timing while the EOI sweep is being performed.

The predetermined range may include a plurality of predetermined EOI timings. The fuel control module 204 may set the EOI timing for the next combustion event of the cylinder 112 to one of the predetermined EOI timings in performing the sweep. After the next combustion event, a selection module 232 may select a greatest COV from the COVs of all of the cylinders of the engine 102.

If the greatest COV is less than or equal to a second predetermined COV, the fuel control module 204 may return to controlling the EOI timing for a next combustion event of the cylinder 112 based on the COV of the cylinder 112. However, if the greatest COV is greater than the second predetermined COV, the fuel control module 204 may set the EOI timing for a next combustion event of the cylinder 112 to another one of the predetermined EOI timings within the predetermined range. For example only, the second predetermined COV may be approximately 15 percent or 0.15. The second predetermined COV is less than the first predetermined COV.

The fuel control module 204 may deem the performance of the sweep complete when each of the predetermined EOI timings within the predetermined range have previously been selected and the greatest COV remains greater than the second predetermined COV. The fuel control module 204 may transition the EOI sweep signal from the active state to the inactive state when the performance of the sweep is complete.

When the sweep is deemed complete (e.g., when the EOI sweep signal transitions from the active state to the inactive state), the spark control module 208 may advance the spark timing for a next combustion event of the cylinder 112. The spark control module 208 may advance the spark timing by the predetermined amount for each successive combustion event of the cylinder 112 until the greatest COV becomes less than or equal to the second predetermined COV. When the greatest COV is less than or equal to the second predetermined COV, the spark control module 208 may return to controlling the spark timing for the cylinder 112 based on the COV of the cylinder 112.

Figure 3:
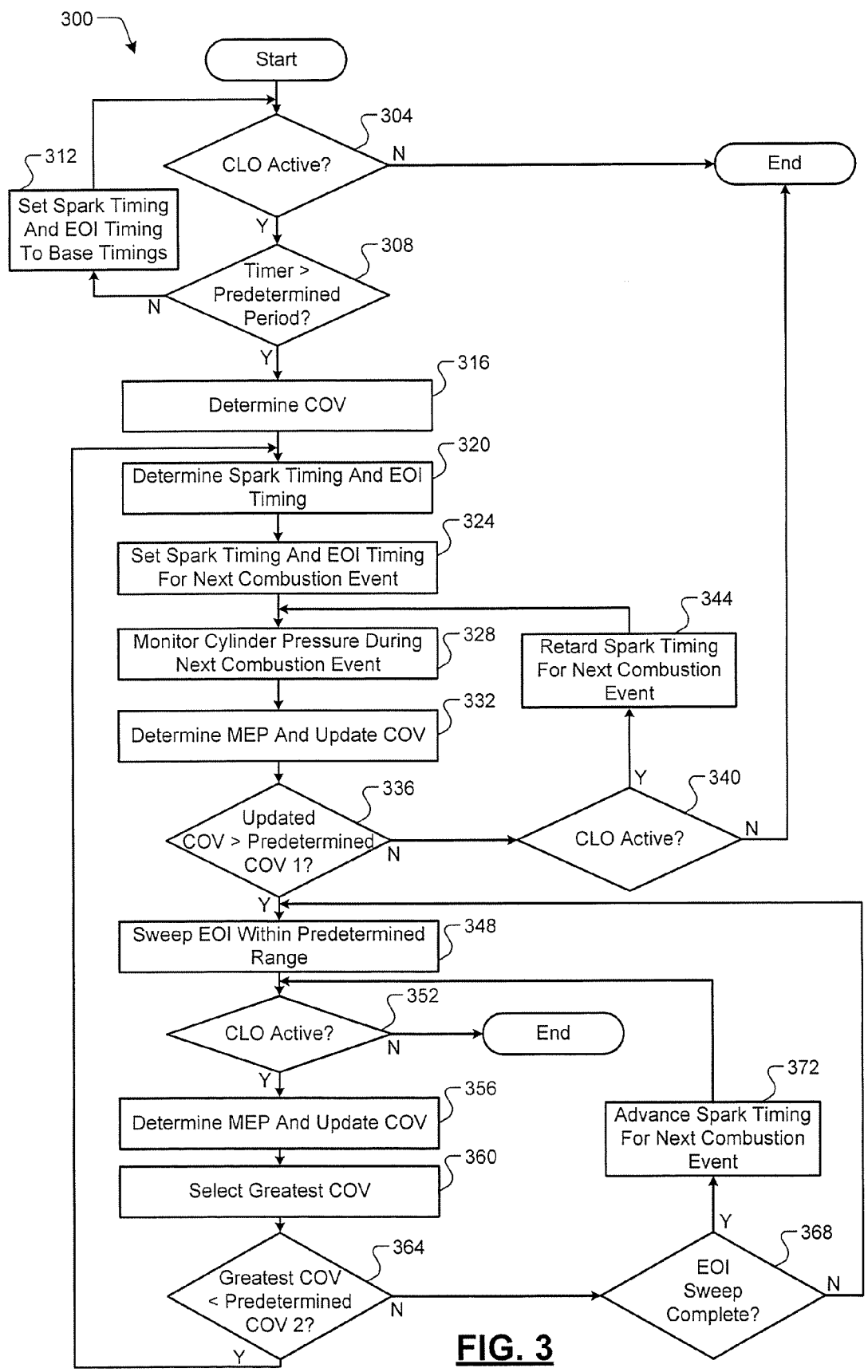
FIG. 3 is a flowchart depicting an exemplary method of controlling provision of fuel and spark to a cylinder during a catalyst lightoff (CLO) event according to the principles of the present disclosure.

Referring now to FIG. 3, a flowchart depicting an exemplary method 300 of controlling the provision of fuel and spark to the cylinder 112 during a CLO event is presented. Control may begin with 304 where control determines whether the CLO event is active. If true, control continues with 308; if false, control ends.

Control determines whether the timer is greater than the predetermined period at 308. In other words, control determines whether the CLO event has been active for at least the predetermined period at 308. If true, control continues with 316; if false, control sets the spark timing and the EOI timing for the cylinder 112 to the predetermined (e.g., base) spark and EOI timings, respectively, at 312 and returns to 304. For example only, the predetermined period may be approximately 1.0 s or another suitable period during which control may determine the predetermined number of MEPs.

At 316, control determines the COV for the cylinder 112 based on the predetermined number of MEPs determined for the cylinder 112. Control determines the MEPs based on the cylinder pressure measured by the cylinder pressure sensor 152 during the predetermined number of combustions of the cylinder 112, respectively. At 320, control determines the spark timing and the EOI timing for a next combustion event of the cylinder 112 based on the COV. Control sets the spark timing and the EOI timing for the next combustion event of the cylinder 112 at 324 to the determined spark and EOI timings, respectively.

At 328, control monitors the cylinder pressure measured by the cylinder pressure sensor 152 during the next combustion event of the cylinder 112. Control determines a new MEP for the next combustion event based on the cylinder pressure and updates the COV based on the new MEP at 332. Control determines whether the updated COV is greater than the first predetermined COV at 336. If false, control continues with 340; if true, control continues with 348. 348 is discussed further below. For example only, the first predetermined COV may be approximately 17 percent or 0.17.

At 340, control determines whether the CLO event is active. If true, control retards the spark timing for a next combustion event of the cylinder 112 at 344 and returns to 328. Control also maintains the EOI timing for the next combustion event at 344. Control may retard the spark timing by a predetermined amount in various implementations.

At 348 (i.e., when the updated COV is greater than the first predetermined COV), control sweeps the EOI timing within the predetermined range. Control may set the EOI timing for a next combustion event of the cylinder 112 to one of the predetermined EOI timings within the range at 348. Control maintains the spark timing for the next combustion event at 348. Control may determine whether the CLO event is active at 352. If true, control continues with 356; if false, control ends.

Control determines a new MEP for the next combustion event and updates the COV based on the new MEP at 356. Control selects the greatest COV at 360. More specifically, one COV may be determined for each cylinder of the engine 102, and control may select the greatest one of the COVs as the greatest COV at 360.

Control determines whether the greatest COV is less than the second predetermined COV at 364. If true, control may return to 320; if false, control may continue with 368. In this manner, control may return to controlling the spark timing and the EOI based on the COV of the cylinder 112 when the greatest COV is less than the second predetermined COV. For example only, the second predetermined COV may be approximately 15 percent or 0.15.

At 368, control determines whether the EOI sweep is complete. If true, control advances the spark timing for a next combustion event of the cylinder 112 at 372 and returns to 352; if false, control returns to 348. At 348, control selects another one of the predetermined EOIs within the predetermined range that has not been previously selected. The EOI sweep may be deemed complete once all of the predetermined EOIs within the predetermined range have been selected at 348.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A combustion control system for a direct injection engine, comprising:
a mean effective pressure (MEP) determination module that determines a MEP for a first combustion event of a cylinder based on cylinder pressure measured by a cylinder pressure sensor during the first combustion event;
a coefficient of variation (COV) determination module that determines a COV for the cylinder based on the MEP;
a spark control module that selectively sets a spark timing for a second combustion event of the cylinder based on the COV, wherein the second combustion event is after the first combustion event; and
a fuel control module that selectively provides fuel for the second combustion event based on the COV,
wherein the fuel control module determines an end of injection (EOI) timing based on the COV and disables the provision of fuel during the second combustion event at the EOI timing.

2. The combustion control system of claim 1 wherein the first and second combustion events occur while a catalyst lightoff (CLO) event is active.

3. The combustion control system of claim 1 wherein the fuel control module injects fuel into the cylinder in two separate injections during the second combustion event, and
wherein the fuel control module disables a later occurring one of the two injections at the EOI timing.

4. The combustion control system of claim 1 wherein the spark control module sets the spark timing to a predetermined spark timing for a predetermined period after a catalyst lightoff (CLO) event begins, and
wherein the fuel control module sets the EOI timing to a predetermined EOI timing for the predetermined period.

5. The combustion control system of claim 1 wherein the COV determination module updates the COV after the second combustion event based on a second MEP determined for the second combustion event, and
wherein the spark control module, relative to the spark timing for the second combustion event, selectively retards the spark timing for a third combustion event of the cylinder when the COV is less than a predetermined COV.

6. The combustion control system of claim 5 wherein the fuel control module maintains the provision of fuel for the third combustion event relative to the provision of fuel for the second combustion event.

7. The combustion control system of claim 1 wherein the COV determination module updates the COV after the second combustion event based on a second MEP determined for the second combustion event, and
wherein the fuel control module selectively sets the EOI timing for a third combustion of the cylinder within a predetermined EOI timing range when the COV is greater than a predetermined COV.

8. The combustion control system of claim 5 wherein the spark control module maintains the spark timing for the third combustion event relative to the spark timing for the second combustion event.

9. The combustion control system of claim 8 wherein the COV determination module updates the COV after the third combustion event based on a third MEP determined for the third combustion event, wherein the COV determination module determines COVs for other cylinders of the engine, respectively, and
wherein the spark control module selectively advances the spark timing for a fourth combustion event of the cylinder, relative to the spark timing for the third combustion event, when a greatest one of the COVs is greater than a second predetermined COV.

10. A combustion control method for a direct injection engine, comprising:

determining a mean effective pressure (MEP) for a first combustion event of a cylinder based on cylinder pressure measured by a cylinder pressure sensor during the first combustion event;

determining a coefficient of variation (COV) for the cylinder based on the MEP;

selectively setting a spark timing for a second combustion event of the cylinder based on the COV, wherein the second combustion event is after the first combustion event;

selectively providing fuel for the second combustion event based on the COV;

determining an end of injection (EOI) timing based on the COV; and disabling the provision of fuel during the second combustion event at the EOI timing.

11. The combustion control method of claim 10 wherein the first and second combustion events occur while a catalyst lightoff (CLO) event is active.

12. The combustion control method of claim 10 further comprising:

injecting the fuel into the cylinder in two separate injections during the second combustion event; and ending a later occurring one of the two injections at the EOI timing.

13. The combustion control method of claim 10 further comprising:

setting the spark timing to a predetermined spark timing for a predetermined period after a catalyst lightoff (CLO) event begins; and setting the EOI timing to a predetermined EOI timing for the predetermined period.

14. The combustion control method of claim 10 further comprising:

updating the COV after the second combustion event based on a second MEP determined for the second combustion event; and, relative to the spark timing for the second combustion event, selectively retarding the spark timing for a third combustion event of the cylinder when the COV is less than a predetermined COV.

15. The combustion control method of claim 14 further comprising maintaining the provision of fuel for the third combustion event relative to the provision of fuel for the second combustion event.

16. The combustion control method of claim 10 further comprising:

updating the COV after the second combustion event based on a second MEP determined for the second combustion event; and selectively setting the EOI timing for a third combustion of the cylinder within a predetermined EOI timing range when the COV is greater than a predetermined COV.

17. The combustion control method of claim 14 further comprising maintaining the spark timing for the third combustion event relative to the spark timing for the second combustion event.

18. The combustion control method of claim 17 further comprising:

updating the COV after the third combustion event based on a third MEP determined for the third combustion event;

determining COVs for other cylinders of the engine, respectively, and selectively advancing the spark timing for a fourth combustion event of the cylinder, relative to the spark timing for the third combustion event, when a greatest one of the COVs is greater than a second predetermined COV.

* * * * *